US012688826B2

(12) United States Patent
Choi et al.

(10) Patent No.: US 12,688,826 B2
(45) Date of Patent: Jul. 21, 2026

(54) DISPLAY DEVICE AND OPERATING METHOD THEREOF

(71) Applicant: Samsung Display Co., LTD., Yongin-si (KR)

(72) Inventors: Hakmo Choi, Yongin-si (KR); Seyun Kim, Yongin-si (KR); Huisu Kim, Yongin-si (KR); Hyungwoo Yim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/740,082

(22) Filed: Jun. 11, 2024

(65) Prior Publication Data

US 2024/0420635 A1 Dec. 19, 2024

(30) Foreign Application Priority Data

Jun. 19, 2023 (KR) ........................ 10-2023-0077948

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 3/2092* (2013.01); *G09G 2300/0819* (2013.01); *G09G 2300/0842* (2013.01); *G09G 2300/0861* (2013.01); *G09G 2320/0242* (2013.01); *G09G 2330/028* (2013.01)

(58) Field of Classification Search
CPC .. G09G 3/3233; G09G 3/2007; G09G 3/2092; G09G 3/3291
See application file for complete search history.

(56) References Cited

U.S. PATENT DOCUMENTS

| | | | | |
|---|---|---|---|---|
| 2018/0277030 | A1* | 9/2018 | Wang | G09G 3/2092 |
| 2020/0168150 | A1* | 5/2020 | Lin | G09G 3/32 |
| 2020/0211457 | A1* | 7/2020 | Kim | G09G 3/3233 |
| 2022/0343825 | A1* | 10/2022 | Ha | G09G 3/2007 |
| 2023/0046059 | A1* | 2/2023 | Park | G09G 3/3233 |

FOREIGN PATENT DOCUMENTS

KR 1020210039880 A 4/2021

* cited by examiner

*Primary Examiner* — Sardis F Azongha
(74) *Attorney, Agent, or Firm* — CANTOR COLBURN LLP

(57) ABSTRACT

A display device includes: a display panel, which includes a pixel; a voltage generator, which generates a driving voltage for an operation of the display panel; and a driving controller, which receives an input image signal and outputs an output image signal obtained by compensating for the input image signal based on a characteristic of the display panel. The driving controller includes: a control unit, which outputs an error correction value corresponding to a voltage difference between a voltage level of the driving voltage provided from the voltage generator and a voltage level stored in advance in the control unit when the driving voltage is provided from the voltage generator; and an image correction unit. which converts the input image signal into the output image signal based on the error correction value.

18 Claims, 14 Drawing Sheets

DISPLAY DEVICE AND OPERATING METHOD THEREOF

This application claims priority to Korean Patent Application No. 10-2023-0077948, filed on Jun. 19, 2023, in the Korean Intellectual Property Office, and all the benefits accruing therefrom under 35 U.S.C. § 119, the content of which in its entirety is herein incorporated by reference.

BACKGROUND

Embodiments of the present disclosure described herein relate to a display device, and more particularly, relate to a display device capable of compensating for an image signal so as to be suitable for a characteristic of a display panel.

In general, a display device includes a display panel for displaying an image and a driving circuit driving the display panel. The display panel includes a plurality of scan lines, a plurality of data lines, and a plurality of pixels. The driving circuit includes a data driving circuit that outputs data driving signals to the data lines, a scan driving circuit that outputs scan signals for driving the scan lines, and a driving controller that controls the data driving circuit and the scan driving circuit.

The display device may display an image by outputting a scan signal to a scan line connected to a pixel targeted for display and providing a data voltage corresponding to a display image to a data line connected to the pixel.

SUMMARY

Embodiments of the present disclosure provide a display device in which the quality of display is improved and an operating method thereof.

According to an embodiment, a display device includes: a display panel including a pixel; a voltage generator, which generates a driving voltage for an operation of the display panel; and a driving controller, which receives an input image signal and outputs an output image signal obtained by compensating for the input image signal based on a characteristic of the display panel. The driving controller includes: a control unit, which outputs an error correction value corresponding to a voltage difference between a voltage level of the driving voltage provided from the voltage generator and a voltage level stored in advance in the control unit when the driving voltage is provided from the voltage generator; and an image correction unit, which converts the input image signal into the output image signal based on the error correction value.

In an embodiment, the error correction value may include a first error correction value for error correction of sensing compensation and a second error correction value for error correction of optical compensation.

In an embodiment, the sensing compensation may be to compensate for a voltage difference between a voltage of a data signal provided to the pixel and a sensing voltage fed back from the pixel.

In an embodiment, the display device may further include: a data driving circuit, which converts the output image signal into a data signal based on the driving voltage and provides the data signal to the pixel.

In an embodiment, the optical compensation may be to compensate for a color characteristic variance between grayscales of the data signal provided to the display panel.

In an embodiment, the control unit may further output a voltage control signal for changing the voltage level of the driving voltage.

In an embodiment, the voltage generator may change the voltage level of the driving voltage in response to the voltage control signal.

In an embodiment, the voltage level stored in advance in the control unit may be a voltage level of a driving voltage generated from a test-dedicated voltage generator used in a manufacturing process.

According to an embodiment, a display device includes: a display panel, which includes a pixel; a voltage generator, which generates a driving voltage for an operation of the display panel; and a driving controller, which receives an input image signal and outputs an output image signal obtained by compensating for the input image signal based on a characteristic of the display panel. The driving controller includes: a control unit, which outputs an error correction value corresponding to a voltage difference between a voltage level of the driving voltage provided from the voltage generator and a voltage level stored in advance in the control unit when the driving voltage is provided from the voltage generator; an image correction unit, which outputs an intermediate image signal obtained by compensating for the input image signal based on the characteristic of the display panel; and a voltage difference compensation lookup table, which converts the intermediate image signal into the output image signal based on the error correction value.

In an embodiment, the error correction value may include a first error correction value for error correction of sensing compensation and a second error correction value for error correction of optical compensation.

In an embodiment, the sensing compensation may be to compensate for a voltage difference between a voltage of a data signal provided to the pixel and a sensing voltage fed back from the pixel.

In an embodiment, the display device may include a data driving circuit, which converts the output image signal into a data signal based on the driving voltage and provides the data signal to the pixel.

In an embodiment, the optical compensation may be to compensate for a color characteristic variance between grayscales of the data signal provided to the display panel.

In an embodiment, the control unit may further output a voltage control signal for changing the voltage level of the driving voltage.

In an embodiment, the voltage generator may change the voltage level of the driving voltage in response to the voltage control signal.

In an embodiment, the voltage level stored in advance in the control unit may be a voltage level of a driving voltage generated from a test-dedicated voltage generator used in a manufacturing process.

According to an embodiment, an operating method of a display device includes: determining whether voltage information of a driving voltage provided from a voltage generator coincides with voltage information stored in advance when the voltage information of the driving voltage is provided from the voltage generator; determining whether a sensing compensation history exists, when the voltage information stored in advance does not coincide with the voltage information of the driving voltage provided from the voltage generator; providing a first error correction value for error correction of sensing compensation and a second error correction value for error correction of optical compensation, when the sensing compensation history does not exist; and compensating for an input image signal based on the first error correction value and the second error correction value and proving an output image signal, which is obtained by compensating for the input image signal, to a display panel.

In an embodiment, the method may further include: determining whether a difference value of the voltage information stored in advance and the voltage information of the driving voltage provided from the voltage generator is capable of being compensated for by the sensing compensation, when it is determined that the sensing compensation history exists; and compensating for the input image signal based on the second error correction value and outputting the output image signal, which is obtained by compensating for the input image signal based on the second error correction value, when it is determined that the difference value of the voltage information stored in advance and the voltage information of the driving voltage provided from the voltage generator is capable of being compensated for by the sensing compensation.

In an embodiment, the method may further include compensating for the input image signal based on the first error correction value and the second error correction value and outputting the output image signal, which is obtained by compensating for the input image signal based on the first error correction value and the second error correction value, when it is determined that the difference value of the voltage information stored in advance and the voltage information of the driving voltage provided from the voltage generator is incapable of being compensated by the sensing compensation.

In an embodiment, the sensing compensation may be to compensate for a voltage difference between a voltage of a data signal provided to a pixel of the display panel and a sensing voltage fed back from the pixel, and the optical compensation may be to compensate for a color characteristic variance between grayscales of the data signal provided to the display panel.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
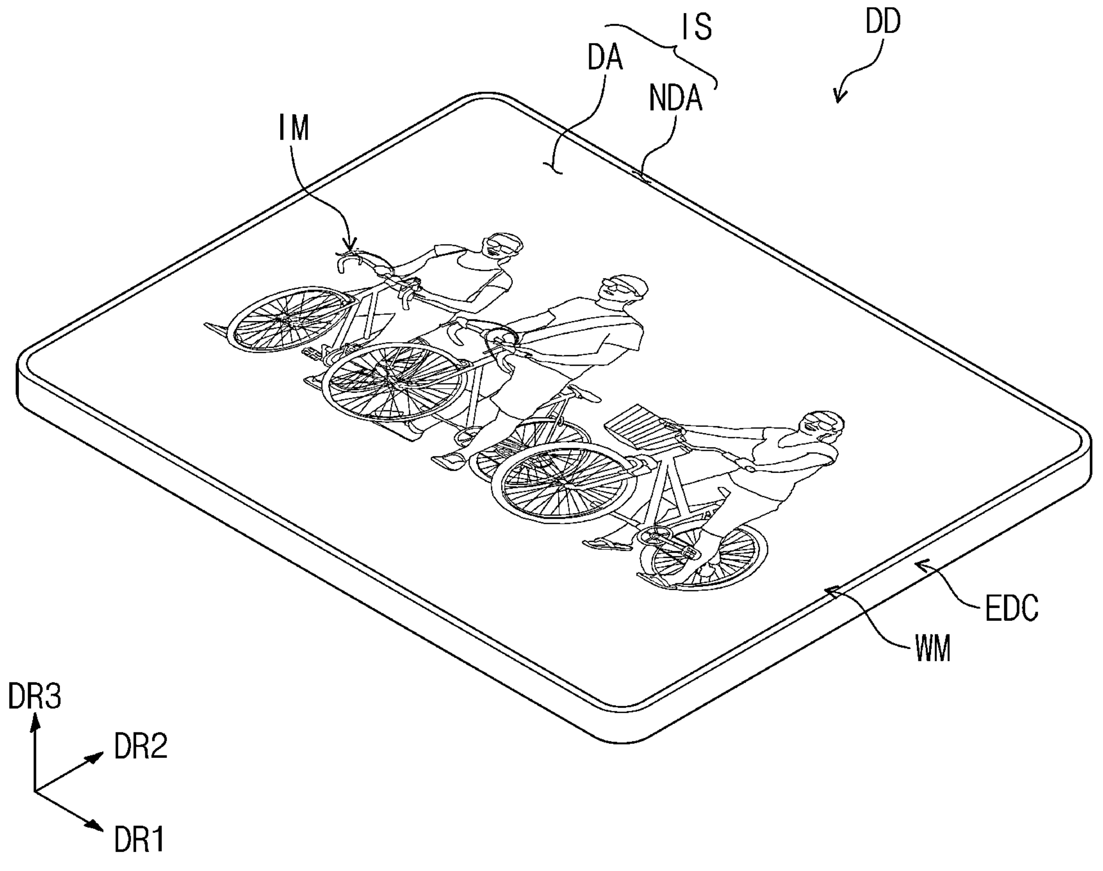
FIG. 1 is a perspective view illustrating a display device according to an embodiment of the present disclosure.

In the specification, the expression that a first component (or region, layer, part, etc.) is "on", "connected to", or "coupled to" a second component means that the first component is directly on, connected to, or coupled to the second component or means that a third component is interposed therebetween.

The same reference numerals/signs refer to the same components. Also, in drawings, the thickness, ratio, and dimension of components are exaggerated for effectiveness of description of technical contents. "At least one" is not to be construed as limiting "a" or "an." "Or" means "and/or." The term "and/or" includes one or more combinations of the associated listed items.

The terms "first", "second", etc. are used to describe various components, but the components are not limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

Figure 2:
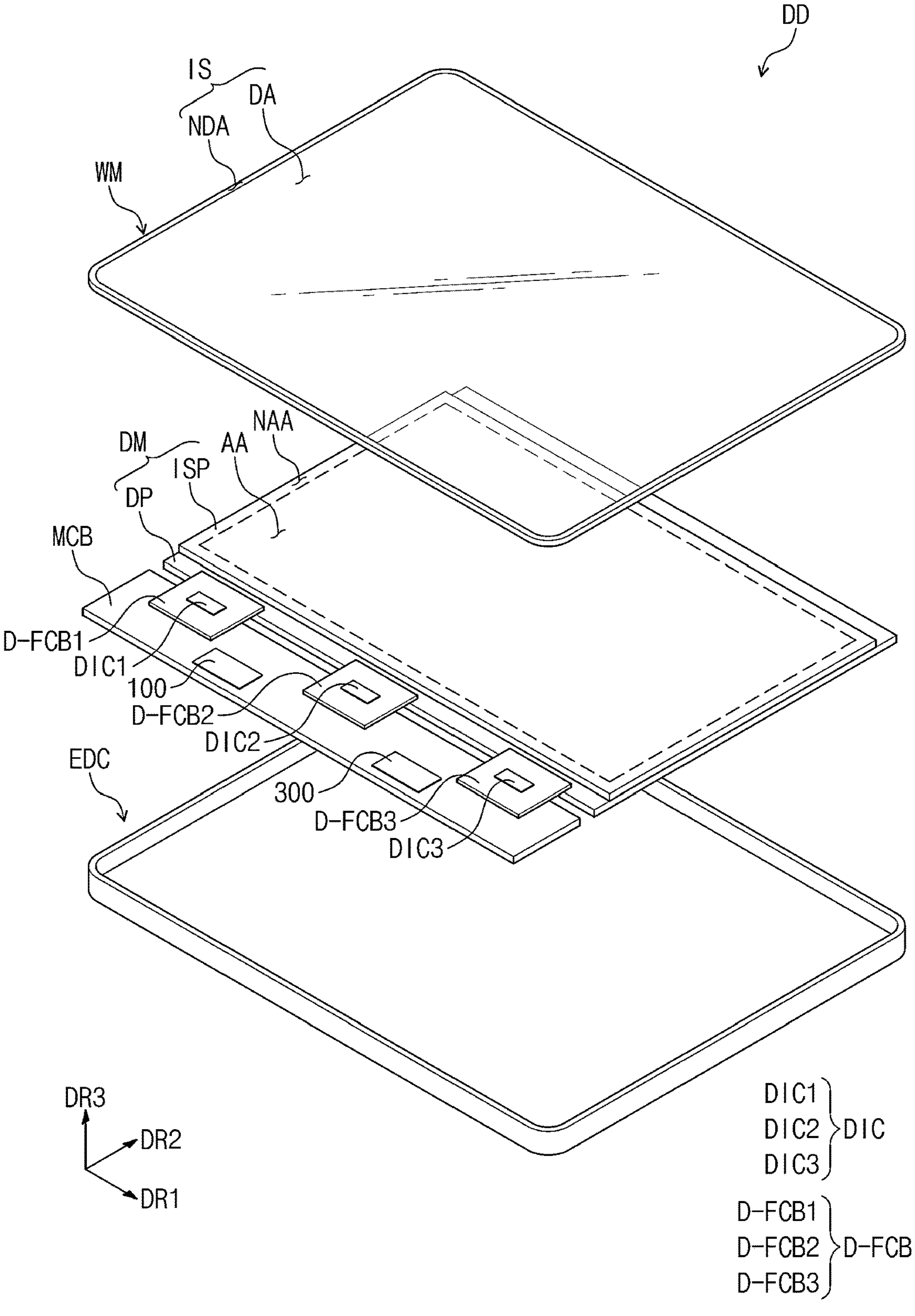
FIG. 2 is an exploded perspective view of a display device according to an embodiment of the present disclosure.

FIG. 1 is a perspective view of a display device according to an embodiment of the present disclosure, and FIG. 2 is an exploded perspective view of a display device according to an embodiment of the present disclosure.

Referring to FIGS. 1 and 2, a display device DD may be a device that is activated depending on an electrical signal. The display device DD according to the present disclosure may be a small and medium-sized electronic device such as a mobile phone, a tablet, an automotive navigation system, or a game console, as well as a large-sized electronic device such as a television or a monitor. The above examples are provided only as an example, and it is obvious that the display device DD may include any other display device(s) without departing from the concept of the invention. The display device DD is in the shape of a rectangle having a long edge (or side) in a first direction DR1 and having a short edge (or side) in a second direction DR2 intersecting the first direction DR1. However, the shape of the display device DD is not limited thereto. For another example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, a light, heat, his/her eye, and pressure, or a combination thereof. Also, the display device DD may sense the external input of the user applied to the side surface or rear surface of the display device DD depending on a structure of the display device DD and is not limited to any one embodiment. As an example of the present disclosure, the external input may include an input that is applied by using an input device (e.g., a stylus pen, an active pen, a touch pen, an electronic pen, or an E-pen).

The display surface IS of the display device DD may be divided into a display area DA and a non-display area NDA. The display area DA may refer to an area in which the image IM is displayed. The user visually perceives the image IM through the display area DA. In an embodiment, the display area DA is illustrated in the shape of a quadrangle whose vertexes are rounded. However, this is illustrated as an example. The display area DA may have various shapes, not limited to any one embodiment.

The non-display area NDA is adjacent to the display area DA. The non-display area NDA may have a given color. The non-display area NDA may surround the display area DA. As such, the shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to any one embodiment.

As illustrated in FIG. 2, the display device DD may include a display module DM, a main circuit board MCB, flexible circuit films D-FCB, driver chips DIC, and a window WM. The display module DM may include a display panel DP and an input sensing layer ISP.

The display panel DP according to an embodiment of the present disclosure may be a light emitting display panel. In an embodiment, for example, the display panel DP may be an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, etc. In an embodiment, below, the description will be given under the condition that the display panel DP is an organic light emitting display panel.

The display panel DP may output the image IM, and the output image IM may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be disposed on the display panel DP by a consecutive process. That is, in the case where the input sensing layer ISP is directly disposed on the display panel DP, an inner adhesive film (not illustrated) is not interposed between the input sensing layer ISP and the display panel DP. In another embodiment, the inner adhesive film may be interposed between the input sensing layer ISP and the display panel DP. In this case, the input sensing layer ISP is not manufactured by a process subsequent to the same manufacturing process of the display panel DP. That is, the input sensing layer ISP may be manufactured through a process that is independent of the manufacturing process of the display panel DP and may then be fixed on the upper surface of the display panel DP by the inner adhesive film.

The window WM may be formed of a transparent material capable of outputting the image IM. In an embodiment, for example, the window WM may be formed of glass, sapphire, plastic, etc. An example in which the window WM is implemented with a single layer is illustrated, but the present disclosure is not limited thereto. For another example, the window WM may include a plurality of layers.

In an embodiment, the window WM may include a light blocking pattern for defining the non-display area NDA. The light blocking pattern that is a colored organic film may be formed, for example, in a coating manner.

The window WM may be coupled to the display module DM by an adhesive film. As an example of the present disclosure, the adhesive film may include an optically clear adhesive ("OCA") film. However, the adhesive film is not limited thereto. For another example, the adhesive film may include a typical adhesive or sticking agent. In an embodiment, for example, the adhesive film may include an optically clear resin ("OCR") film or a pressure sensitive adhesive ("PSA") film.

An anti-reflection layer may be further interposed between the window WM and the display module DM. The anti-reflection layer decreases reflectance of an external light incident from above the window WM. The anti-reflection layer according to an embodiment of the present disclosure may include a phase retarder and a polarizer. The polarizer may be of a film type or a liquid crystal coating type. The polarizer may also be of a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example of the present disclosure, the anti-reflection layer may also include color filters. The arrangement of color filters may be determined in consideration of colors of lights that a plurality of pixels PX (refer to FIG. 3) included in the display panel DP generate. Also, the anti-reflection layer may further include a light blocking pattern.

The display module DM may display the image IM depending on an electrical signal and may transmit/receive information about an external input. The display module DM may be defined by an effective area AA and a non-effective area NAA. The effective area AA may be defined as an area through which the image IM provided from the display area DA is output. Also, the effective area AA may be defined as an area in which the input sensing layer ISP senses an external input applied from the outside.

The non-effective area NAA is adjacent to the effective area AA. In an embodiment, for example, the non-effective area NAA may surround the effective area AA. However, this is illustrated as an example. In an embodiment, for example, the non-effective area NAA may be defined in various shapes, not limited to any one embodiment. According to an embodiment, the effective area AA of the display module DM may correspond to at least a portion of the display area DA.

The main circuit board MCB may be connected to the flexible circuit films D-FCB so as to be electrically connected to the display panel DP. The flexible circuit films D-FCB are connected to the display panel DP so as to electrically connect the display panel DP to the main circuit board MCB.

The main circuit board MCB may include a driving controller 100 and a voltage generator 300. The driving controller 100 may include circuits for driving the display panel DP. The driver chips DIC may be mounted on the flexible circuit films D-FCB, respectively.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be positioned spaced from one another in the first direction DR1 and may be connected with the display panel DP so as to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, the present disclosure is not limited thereto. For another example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be mounted on the flexible circuit films, respectively.

A structure in which the first to third driver chips DIC1, DIC2, and DIC3 are mounted on the first to third flexible circuit films D-FCB1, D-FCB2, and D-FCB3 is illustrated in FIG. 2, respectively, but the present disclosure is not limited thereto. For another example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. Also, the first to third driver chips DIC1, DIC2, and DIC3 may be directly mounted on the main circuit board MCB.

The input sensing layer ISP may be electrically connected to the main circuit board MCB through the display panel DP and the flexible circuit films D-FCB. However, the present disclosure is not limited thereto. That is, the display device DD may additionally include a separate flexible circuit film for electrically connecting the input sensing layer ISP and the main circuit board MCB in another embodiment.

The display device DD further includes an outer case EDC accommodating the display module DM. The outer case EDC may be coupled to the window WM to define the exterior of the display device DD. The outer case EDC may absorb shocks from the outside and may prevent a foreign material/moisture or the like from being infiltrated into the display module DM such that components accommodated in the outer case EDC are protected. Meanwhile, as an example of the present disclosure, the outer case EDC may be implemented by coupling a plurality of accommodating members.

The display device DD according to an embodiment may further include an electronic module including various functional modules for operating the display module DM, a power supply module (e.g., a battery) for supplying a power for an overall operation of the display device DD, a bracket coupled to the display module DM and/or the outer case EDC to partition an inner space of the display device DD, etc.

Figure 3:
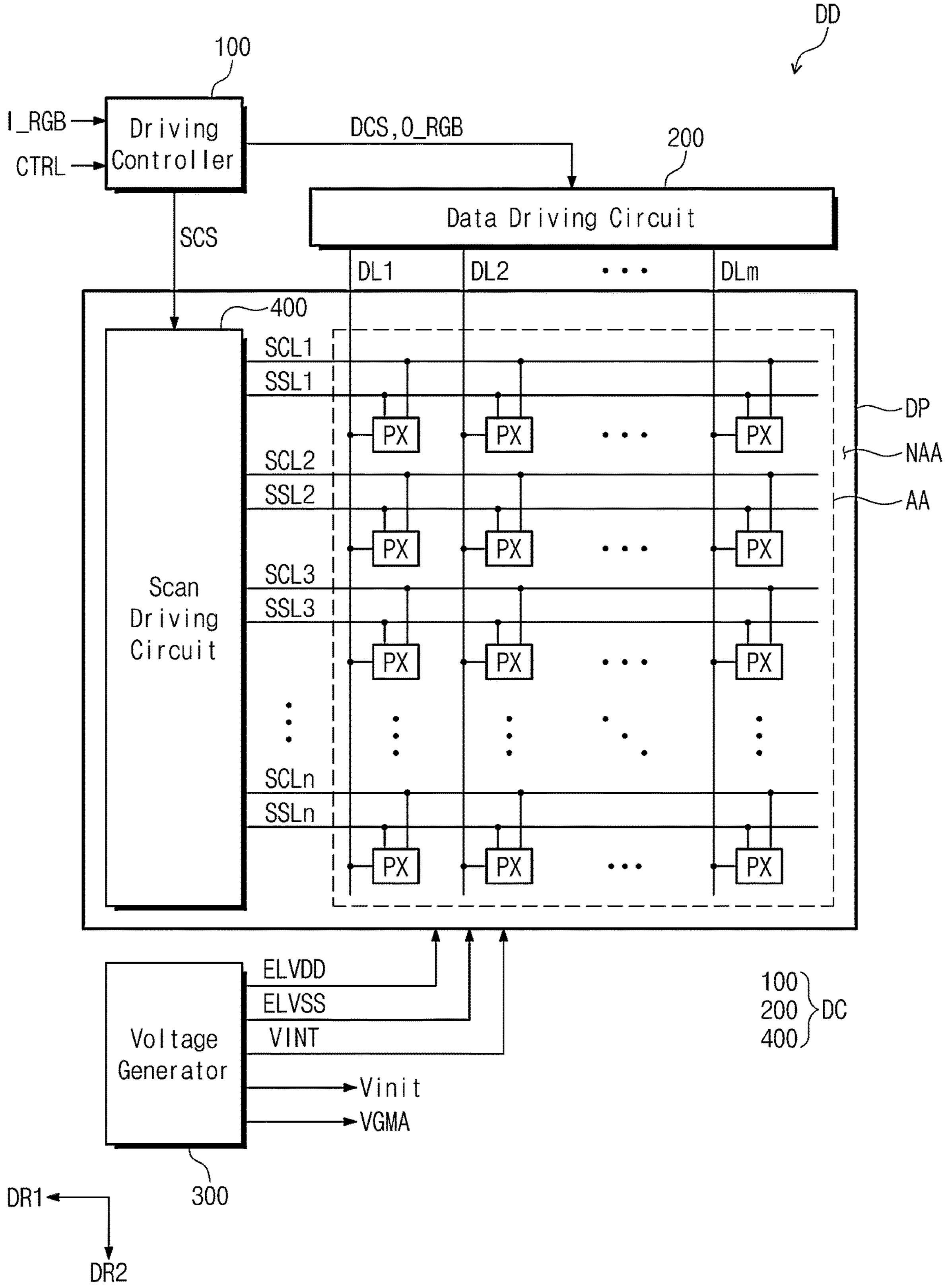
FIG. 3 is a block diagram of a display device according to an embodiment of the present disclosure.

FIG. 3 is a block diagram of a display device according to an embodiment of the present disclosure.

Referring to FIG. 3, the display device DD includes the display panel DP, the driving controller 100, a data driving circuit 200, the voltage generator 300, and a scan driving circuit 400. In an embodiment, the driving controller 100, the data driving circuit 200, and the scan driving circuit 400 may be called a driving circuit DC.

The driving controller 100 receives an input image signal I_RGB and a control signal CTRL. The driving controller 100 compensates for the input image signal I_RGB to be suitable for a characteristic of the display panel DP and outputs an output image signal O_RGB. Also, the driving controller 100 outputs a scan control signal SCS and a data control signal DCS.

The data driving circuit 200 receives the data control signal DCS and the output image signal O_RGB from the driving controller 100. The data driving circuit 200 converts the output image signal O_RGB into data signals and outputs the data signals to a plurality of data lines DL1 to DLm to be described later. The data signals refer to analog voltages corresponding to a grayscale value of the output image signal O_RGB.

The display panel DP includes first scan lines SCL1 to SCLn, second scan lines SSL1 to SSLn, the data lines DL1 to DLm, and the pixels PX. The display panel DP may further include the scan driving circuit 400. In an embodiment, the scan driving circuit 400 may be disposed on a first side of the display panel DP. The first scan lines SCL1 to SCLn and the second scan lines SSL1 to SSLn extend from the scan driving circuit 400 in the first direction DR1.

The driving controller 100, the data driving circuit 200, and the scan driving circuit 400 may constitute a driving circuit for providing data signals and scan signals to the pixels PX of the display panel DP.

The display panel DP may be divided into the effective area AA and the non-effective area NAA. The pixels PX may be disposed in the effective area AA, and the scan driving circuit 400 may be disposed in the non-effective area NAA.

The first scan lines SCL1 to SCLn and the second scan lines SSL1 to SSLn are arranged to be spaced from each other in the second direction DR2. The data lines DL1 to DLm extend from the data driving circuit 200 in the second direction DR2 and are arranged to be spaced from each other in the first direction DR1.

The pixels PX are electrically connected to the first scan lines SCL1 to SCLn, the second scan lines SSL1 to SSLn, and the data lines DL1 to DLm. In an embodiment, for example, pixels belonging to the first row may be connected to the scan lines SCL1 and SSL1. Also, pixels belonging to the second row may be connected to the scan lines SCL2 and SSL2.

Each of the pixels PX includes a light emitting element ED (refer to FIG. 4) and a pixel circuit PXC (refer to FIG. 4) controlling the emission of the light emitting element ED. The pixel circuit PXC may include a plurality of transistors and a capacitor. The scan driving circuit 400 may include transistors formed through the same process as the pixel circuit PXC.

Each of the pixels PX receives a first voltage ELVDD, a second voltage ELVSS, and an initialization voltage VINT.

The scan driving circuit 400 receives the scan control signal SCS from the driving controller 100. In response to the scan control signal SCS, the scan driving circuit 400 may output first scan signals to the first scan lines SCL1 to SCLn and may output second scan signals to the second scan lines SSL1 to SSLn.

In an embodiment, the scan driving circuit 400 is disposed on the first side of the effective area AA, but the present disclosure is not limited thereto. In another embodiment, scan driving circuits may be disposed on the first side and the second side of the effective area AA, respectively. In an embodiment, for example, the scan driving circuit 400 disposed on the first side of the effective area AA may provide the first scan signals to the first scan lines SCL1 to SCLn, and the scan driving circuit disposed on the second side of the effective area AA may provide the second scan signals to the second scan lines SSL1 to SSLn.

The voltage generator 300 generates voltages for the operation of the display panel DP. In an embodiment, the voltage generator 300 generates the first voltage ELVDD, the second voltage ELVSS, and the initialization voltage VINT for the operation of the display panel DP. As well as the first voltage ELVDD, the second voltage ELVSS, and the initialization voltage VINT, the voltage generator 300 may further generate various voltages for the operations of the display panel DP and the scan driving circuit 400. In an embodiment, for example, the voltage generator 300 may generate a first driving voltage Vinit and a second driving voltage VGMA for the operations of the driving controller 100 and the data driving circuit 200.

Figure 4:
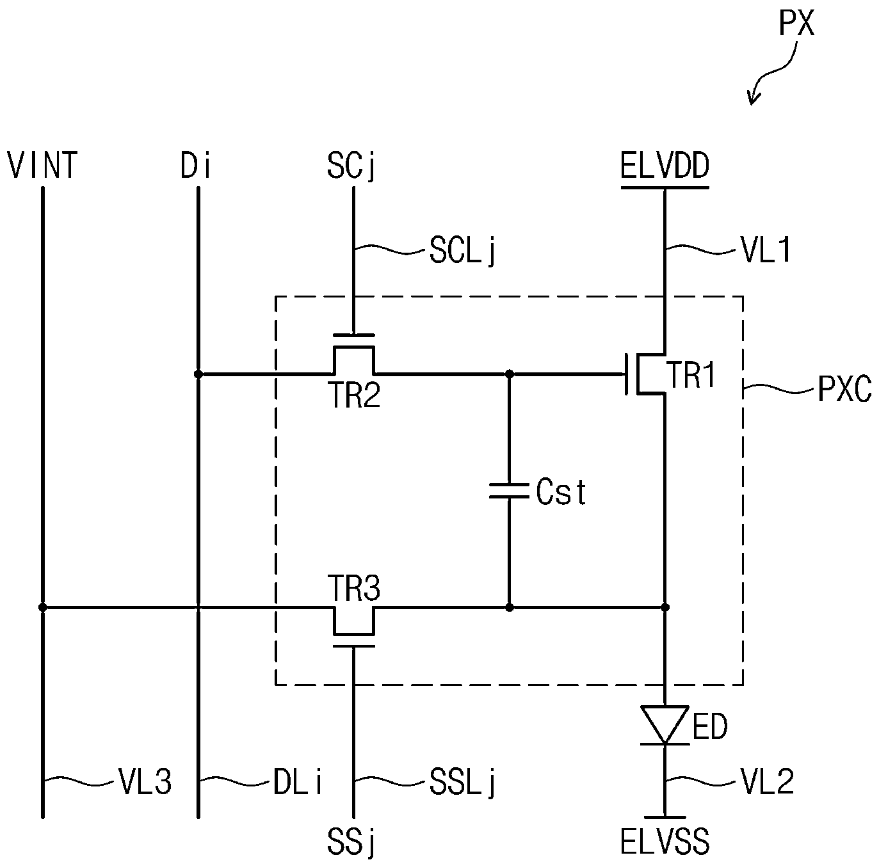
FIG. 4 is an equivalent circuit diagram of a pixel according to an embodiment of the present disclosure.

FIG. 4 is an equivalent circuit diagram of a pixel according to an embodiment of the present disclosure.

FIG. 4 shows an equivalent circuit diagram of a pixel that is connected to the i-th data line DLi among the data lines DL1 to DLm (refer to FIG. 3), the j-th first scan line SCLj among the first scan lines SCL1 to SCLn (refer to FIG. 3), and the j-th second scan line SSLj among the second scan lines SSL1 to SSLn (refer to FIG. 3).

Each of the pixels PX illustrated in FIG. 3 may have the same circuit configuration as the pixel PX illustrated in FIG. 4. In an embodiment, the pixel PX includes at least one light emitting element ED and the pixel circuit PXC.

The pixel circuit PXC may be connected to the light emitting element ED and may provide a current corresponding to a data signal Di transferred from the data line DLi to the light emitting element ED. In an embodiment, the pixel circuit PXC of the pixel PX includes a first transistor TR1, a second transistor TR2, a third transistor TR3, and a capacitor Cst. In an embodiment, each of the first to third transistors TR1 to TR3 may be an N-type transistor using an oxide semiconductor as a semiconductor layer. However, the present disclosure is not limited thereto. In another embodiment, each of the first to third transistors TR1 to TR3 may be a P-type transistor having a low-temperature polycrystalline silicon ("LTPS") semiconductor layer. In an embodiment, at least one of the first to third transistors TR1 to TR3 may be an N-type transistor, and the others thereof may be P-type transistors. Also, the circuit configuration of the pixel circuit PXC according to the present disclosure is not limited to the embodiment of FIG. 4. The pixel circuit PXC illustrated in FIG. 4 is provided only as an example, and the configuration of the pixel circuit PXC may be modified and implemented.

Referring to FIG. 4, the first scan line SCLj may transfer a first scan signal SCj, and the second scan line SSLj may transfer a second scan signal SSj. The data line DLi transfers the data signal Di. The data signal Di may have a voltage level corresponding to the input image signal I_RGB that is input to the display device DD (refer to FIG. 1).

The display panel DP illustrated in FIG. 1 may include first to third voltage lines VL1, VL2, and VL3. The first voltage line VL1 and the third voltage line VL3 may transfer the first voltage ELVDD and the initialization voltage VINT to the pixel circuit PXC, respectively, and the second voltage line VL2 may transfer the second voltage ELVSS to a cathode (or a second terminal) of the light emitting element ED. The third voltage line VL3 may be an initialization voltage line transferring the initialization voltage VINT to the pixel circuit PXC.

The first transistor TR1 includes a first electrode (or a drain electrode) connected to the first voltage line VL1, a second electrode (or a source electrode) electrically connected to an anode (or a first terminal) of the light emitting element ED, and a gate electrode connected to a first end of the capacitor Cst. The first transistor TR1 may supply a driving current to the light emitting element ED in response to the data signal Di that is transferred through the data line DLi depending on a switching operation of the second transistor TR2.

The second transistor TR2 includes a first electrode connected to the data line DLi, a second electrode connected to the gate electrode of the first transistor TR1, and a gate electrode connected to the first scan line SCLj. The second transistor TR2 may be turned on depending on the first scan signal SCj transferred through the first scan line SCLj and may transfer the data signal Di from the data line DLi to the gate electrode of the first transistor TR1.

The third transistor TR3 includes a first electrode connected to the third voltage line VL3, a second electrode connected to the anode of the light emitting element ED, and a gate electrode connected to the second scan line SSLj. The third transistor TR3 may be turned on depending on the second scan signal SSj transferred through the second scan line SSLj and may transfer the initialization voltage VINT to the anode of the light emitting element ED.

The first end of the capacitor Cst is connected to the gate electrode of the first transistor TR1 as described above, and a second end of the capacitor Cst is connected to the second electrode of the first transistor TR1. The structure of the pixel PX according to an embodiment is not limited to the structure illustrated in FIG. 5. In an embodiment, for example, in one pixel PX, the number of transistors, the number of capacitors, and the connection relationship thereof may be variously changed or modified.

Figure 5:
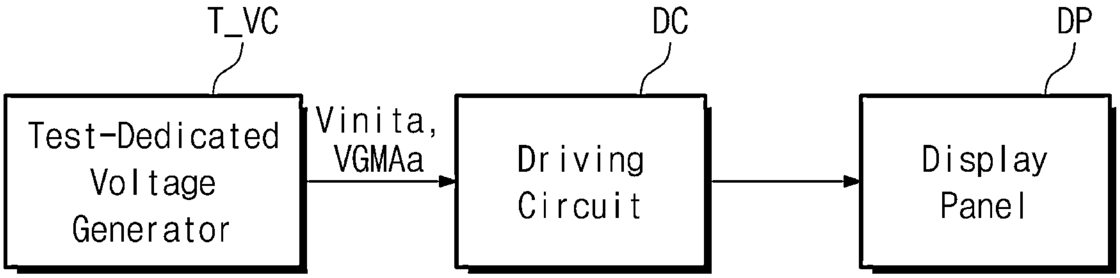
FIG. 5 is a diagram for describing a method for sensing and compensating for a characteristic of a display panel in a manufacturing process.

FIG. 5 is a diagram for describing a method for sensing and compensating for a characteristic of the display panel DP in a manufacturing process.

Referring to FIGS. 3 and 5, characteristics of the respective pixels PX in the display panel DP may be different due to the process variance. At the manufacturing step, the driving circuit DC senses the characteristics of the pixels PX in the display panel DP and calculates a compensation value according to the sensed characteristics. The compensation value may be stored in the driving controller 100 in the driving circuit DC. The driving controller 100 may compensate for the input image signal I_RGB based on a compensation value set in advance and may output the output image signal O_RGB.

Various voltages should be provided to the driving circuit DC and the display panel DP to sense the characteristics of the pixels PX of the display panel DP. In an embodiment, for example, the first voltage ELVDD, the second voltage ELVSS, and the initialization voltage VINT should be provided to the display panel DP, and a first driving voltage Vinita and a second driving voltage VGMAa should be provided to the driving circuit DC.

At the manufacturing step, as illustrated in FIG. 2, after the main circuit board MCB is coupled to the display panel DP, the voltages generated by the voltage generator 300 may be provided to the driving circuit DC and the display panel DP. However, in general, to improve a manufacturing speed, the characteristics of the pixels PX of the display panel DP are sensed by using a test-dedicated voltage generator T_VC before the main circuit board MCB is coupled to the display panel DP. That is, the test-dedicated voltage generator T_VC provides voltages for the operations of the driving circuit DC and the display panel DP, for example, the first voltage ELVDD, the second voltage ELVSS, the initialization voltage VINT, the first driving voltage Vinita, and the second driving voltage VGMAa. In an embodiment, the second driving voltage VGMAa may include a plurality of driving voltages with different voltage levels.

In the manufacturing process, the driving controller 100 in the driving circuit DC may store information about the voltage level of each of the first driving voltage Vinita and the second driving voltage VGMAa provided from the test-dedicated voltage generator T_VC.

Figure 6:
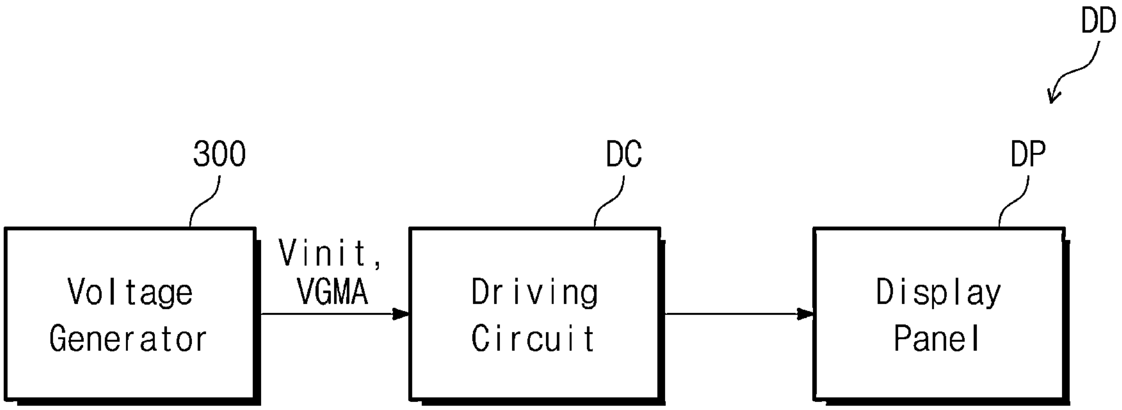
FIG. 6 is a diagram for describing a method for sensing and compensating for a characteristic of a display panel in a display device where a manufacturing process is completed.

FIG. 6 is a diagram for describing a method for sensing and compensating for a characteristic of the display panel DP in the display device DD where the manufacturing process is completed.

Referring to FIGS. 3 and 6, the display device DD where the manufacturing process is completed are provided with the voltages provided from the voltage generator 300, for example, the first voltage ELVDD, the second voltage ELVSS, the initialization voltage VINT, the first driving voltage Vinit, and the second driving voltage VGMA. In an embodiment, the second driving voltage VGMA may include a plurality of driving voltages with different voltage levels.

In an embodiment, the voltage levels of the first driving voltage Vinita and the second driving voltage VGMAa generated by the test-dedicated voltage generator T_VC illustrated in FIG. 5 may be different from the voltage levels of the first driving voltage Vinit and the second driving voltage VGMA generated by the voltage generator 300 illustrated in FIG. 6.

Returning to FIG. 4, the pixel PX may operate in an emission mode and a sensing mode. In the emission mode, when the third transistor TR3 is turned on, the initialization voltage VINT provided from the third voltage line VL3 may be transferred to the anode of the light emitting element ED.

In the sensing mode, when the third transistor TR3 is turned on after the data signal Di is provided through the data line DLi, the voltage of the anode of the light emitting element ED may be provided to a sensing circuit (not illustrated) through the third voltage line VL3. That is, the voltage of the anode of the light emitting element ED corresponding to the data signal Di may be fed back to the sensing circuit as a sensing voltage.

At the manufacturing step, while the first voltage ELVDD, the second voltage ELVSS, the initialization voltage VINT, the first driving voltage Vinita, and the second driving voltage VGMAa are provided to the display panel DP by the test-dedicated voltage generator T_VC illustrated in FIG. 5, the sensing circuit may sense the characteristic of the pixel PX based on a difference between the fed-back sensing voltage and the voltage of the data signal Di provided to the pixel PX.

In an embodiment, the first driving voltage Vinit and the second driving voltage VGMA may be reference voltages that are for the data driving circuit 200 to output the data signal Di corresponding to the output image signal O_RGB.

The characteristic of the pixel PX may be sensed based on the difference between the fed-back sensing voltage and the voltage of the data signal Di provided to the pixel PX, and the driving controller 100 may output the output image signal O_RGB that is obtained by compensating for the input image signal I_RGB depending on the sensed characteristic. In the following description, the operation of compensating for the input image signal I_RGB based on the difference between the fed-back sensing voltage and the voltage of the data signal Di provided to the pixel PX is referred to as "sensing compensation".

Figure 7:
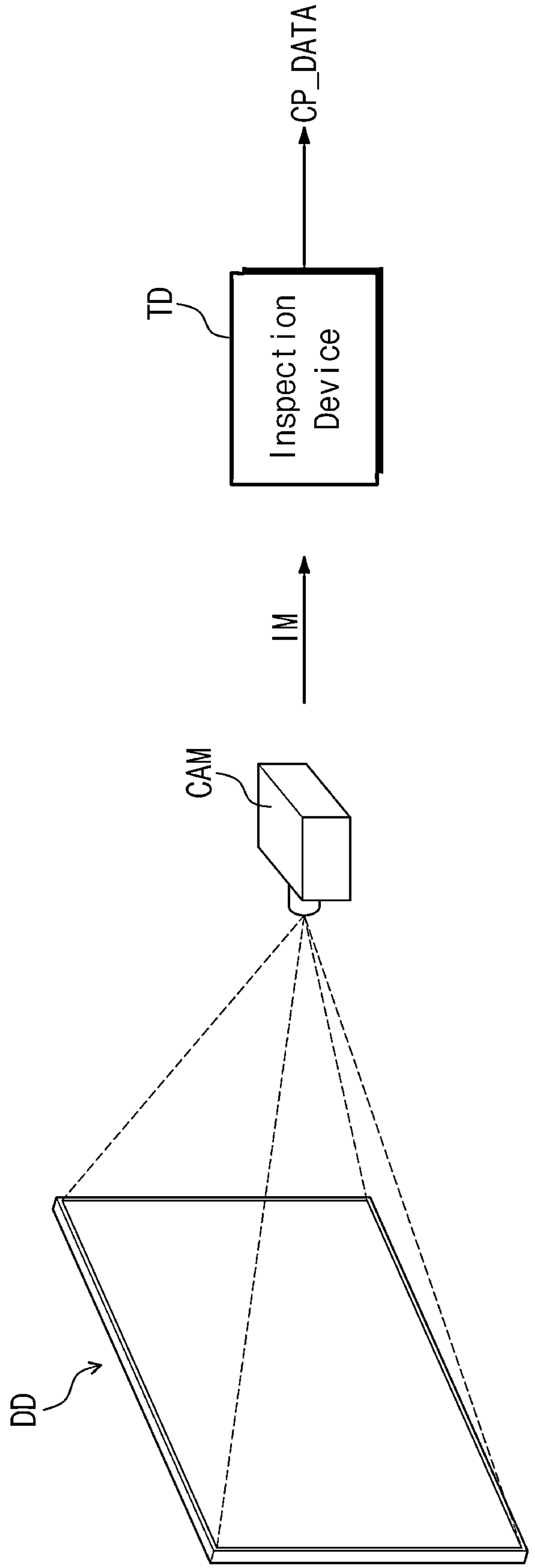
FIG. 7 is a diagram illustrating an inspection process for optical compensation associated with a display panel in a manufacturing process.

FIG. 7 is a diagram illustrating an inspection process for optical compensation associated with the display panel DP in a manufacturing process.

Referring to FIG. 7, a camera CAM may capture an image displayed in the display panel DP and provides a sensing image signal IM to an inspection device TD. The inspection device TD outputs an information signal CP_DATA associated with the characteristic of the display panel DP, based on the sensing image signal IM provided from the camera CAM. The information signal CP_DATA output from the inspection device TD may be stored in the driving controller 100 (refer to FIG. 3) of the display device DD. The driving controller 100 may perform the optical compensation on the input image signal I_RGB based on the information signal CP_DATA and may output the output image signal O_RGB. In the following description, the compensation for the input image signal I_RGB based on an image obtained by the camera CAM is referred to as "optical compensation". The optical compensation may be performed to compensate for a color characteristic variance between grayscales of a data signal provided to the display panel DP. That is, the optical compensation may refer to the compensation for a stain (or spot) of the image displayed by a data signal of the same grayscale. In other words, the optical compensation means compensation for color uniformity improvement in the image displayed in the display panel DP. The inspection process may be performed while the first voltage ELVDD, the second voltage ELVSS, the initialization voltage VINT, the first driving voltage Vinita, and the second driving voltage VGMAa are provided to the display panel DP by the test-dedicated voltage generator T_VC illustrated in FIG. 5.

Figure 8A:
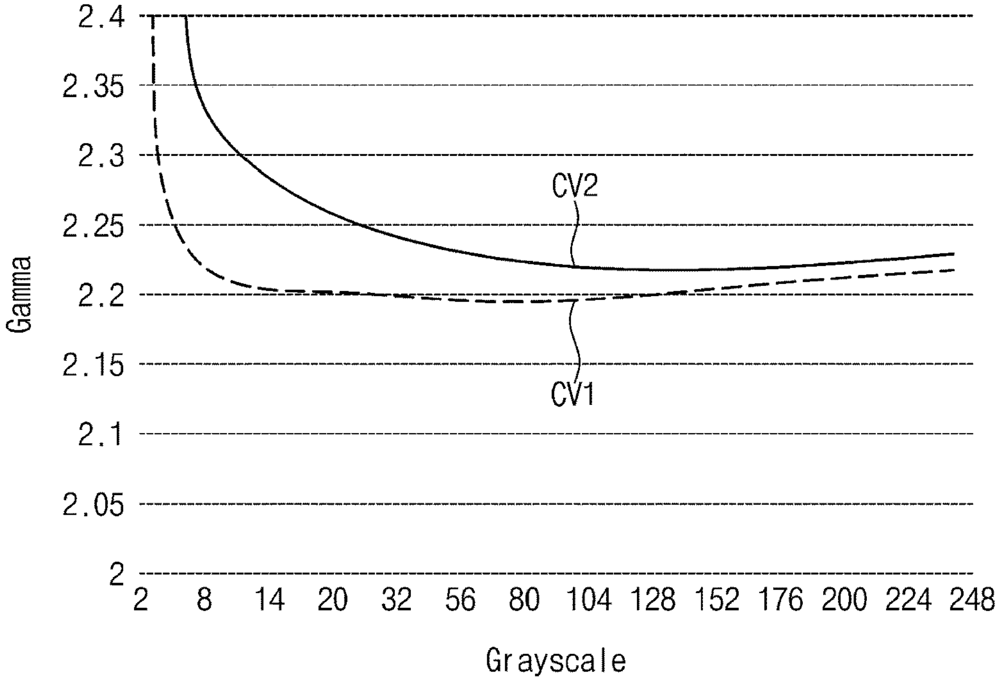
FIG. 8A is a diagram illustrating a gamma characteristic of a display panel.

FIG. 8A is a diagram illustrating a gamma characteristic of a display panel.

In FIG. 8A, a first gamma characteristic curve CV1 indicates the gamma characteristic of the display panel DP while the voltages generated by the test-dedicated voltage generator T_VC illustrated in FIG. 5 are provided to the display panel DP.

In FIG. 8A, a second gamma characteristic curve CV2 indicates the gamma characteristic of the display panel DP while the voltages provided from the voltage generator 300 are provided to the display panel DP after the main circuit board MCB is coupled to the display panel DP as illustrated in FIG. 2.

When the voltage levels of the voltages output from the test-dedicated voltage generator T_VC illustrated in FIG. 5 completely coincide with the voltage levels of the voltages provided from the voltage generator 300 illustrated in FIG. 3, the first gamma characteristic curve CV1 and the second gamma characteristic curve CV2 may coincide with each other.

However, when the voltage levels of the voltages output from the test-dedicated voltage generator T_VC illustrated in FIG. 5 do not completely coincide with the voltage levels of the voltages provided from the voltage generator 300 illustrated in FIG. 6, as illustrated in FIG. 8A, the first gamma characteristic curve CV1 and the second gamma characteristic curve CV2 do not coincide with each other. The first gamma characteristic curve CV1 and the second gamma characteristic curve CV2 may not coincide with each other due to a characteristic difference between the test-dedicated voltage generator T_VC and the voltage generator 300.

While the voltages from the test-dedicated voltage generator T_VC are supplied, the driving circuit DC (refer to FIG. 5) may perform sensing compensation such that most of the gray levels displayed in the display panel DP coincide with gamma 2.2 (i.e., such that the display panel DP has the characteristic of the first gamma characteristic curve CV1). However, when the voltage levels of the voltages provided from the test-dedicated voltage generator T_VC illustrated in FIG. 5 are different from the voltage levels of the voltages provided from the voltage generator 300 illustrated in FIG. 6, the gamma characteristic of the display panel DP may change to the second gamma characteristic curve CV2. The above gamma characteristic offset of the display panel DP may reduce the quality of image of the display device DD.

Figure 8B:
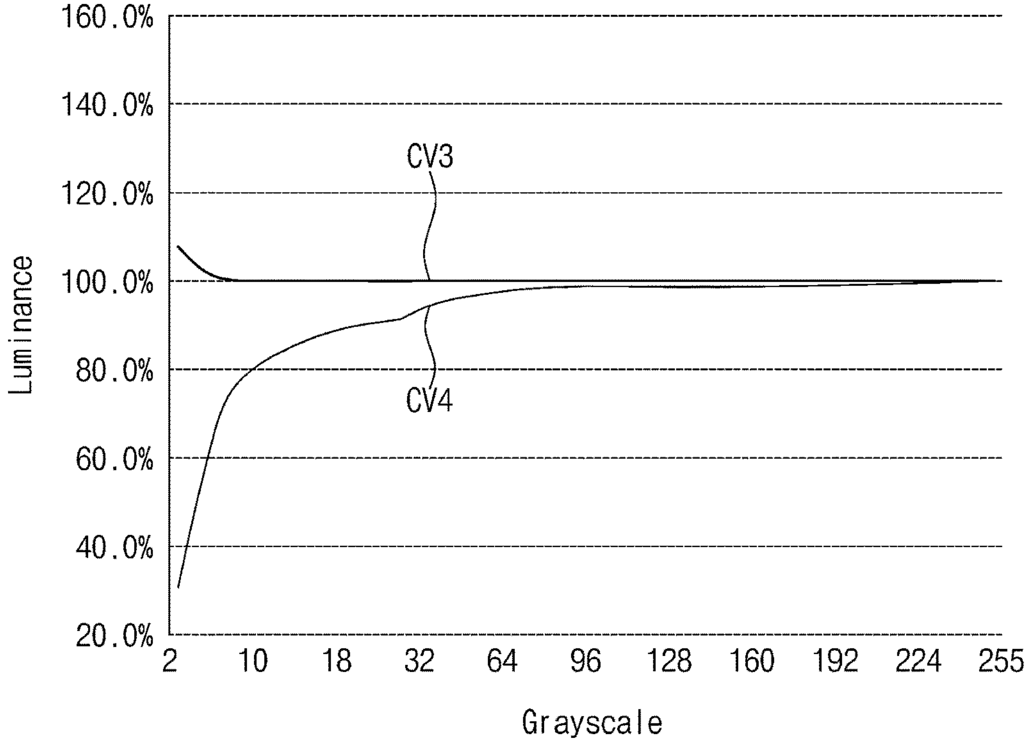
FIG. 8B is a diagram illustrating a luminance characteristic of a display panel.

FIG. 8B is a diagram illustrating a luminance characteristic of a display panel.

In FIG. 8B, a first luminance characteristic curve CV3 indicates the luminance characteristic of the display panel DP while the voltages generated by the test-dedicated voltage generator T_VC illustrated in FIG. 5 are provided to the display panel DP.

In FIG. 8B, a second luminance characteristic curve CV4 indicates the luminance characteristic of the display panel DP while the voltages provided from the voltage generator 300 are provided to the display panel DP after the main circuit board MCB is coupled to the display panel DP as illustrated in FIG. 2.

When the voltage levels of the voltages output from the test-dedicated voltage generator T_VC illustrated in FIG. 5 completely coincide with the voltage levels of the voltages provided from the voltage generator 300 illustrated in FIG. 6, the first luminance characteristic curve CV3 and the second luminance characteristic curve CV4 may coincide with each other.

However, when the voltage levels of the voltages output from the test-dedicated voltage generator T_VC illustrated in FIG. 5 do not completely coincide with the voltage levels of the voltages provided from the voltage generator 300 illustrated in FIG. 6, as illustrated in FIG. 8B, the first luminance characteristic curve CV3 and the second luminance characteristic curve CV4 do not coincide with each other. In an embodiment, the first luminance characteristic curve CV3 and the second luminance characteristic curve CV4 may not coincide with each other due to a characteristic difference between the test-dedicated voltage generator T_VC and the voltage generator 300.

While the voltages from the test-dedicated voltage generator T_VC are supplied, the driving circuit DC (refer to FIG. 5) may perform optical compensation such that the luminance of most of the gray levels displayed in the display panel DP is uniform (i.e., such that the display panel DP has the characteristic of the first luminance characteristic curve CV3). However, when the voltage levels of the voltages provided from the test-dedicated voltage generator T_VC illustrated in FIG. 5 are different from the voltage levels of the voltages provided from the voltage generator 300 illustrated in FIG. 6, the luminance characteristic of the display panel DP may change to the second luminance characteristic curve CV4. The above luminance characteristic offset of the display panel DP may reduce the quality of image of the display device DD.

Figure 9A:
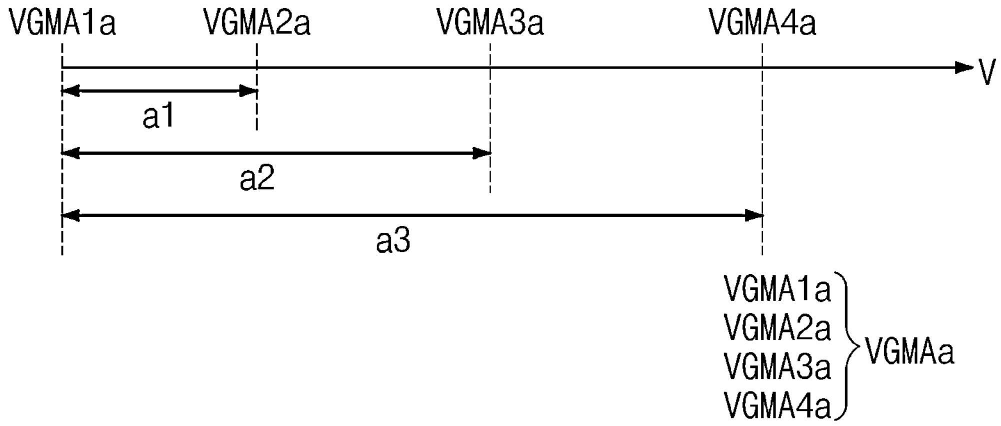
FIG. 9A is a diagram illustrating second driving voltages output from a test-dedicated voltage generator illustrated in FIG. 5.

FIG. 9A is a diagram illustrating the second driving voltages VGMAa output from the test-dedicated voltage generator T_VC illustrated in FIG. 5.

Referring to FIGS. 5 and 9A, the second driving voltages VGMAa output from the test-dedicated voltage generator T_VC include second driving voltages VGMA1a, VGMA2a, VGMA3a, and VGMA4a. The second driving voltages VGMA1a, VGMA2a, VGMA3a, and VGMA4a have different voltage levels. In an embodiment, for example, the second driving voltages VGMA1a and VGMA2a have a voltage difference a1 therebetween, the second driving voltages VGMA1a and VGMA3a have a voltage difference a2 therebetween, and the second driving voltages VGMA1a and VGMA4a have a voltage difference a3 therebetween. Only four second driving voltages VGMA1a, VGMA2a, VGMA3a, and VGMA4a are illustrated in FIG. 9A, but the number of second driving voltages is not limited thereto.

The data driving circuit 200 illustrated in FIG. 3 converts the output image signal O_RGB into data signals based on the second driving voltages VGMA1a, VGMA2a, VGMA3a, and VGMA4a. The data signals may be provided to the plurality of data lines DL1 to DLm.

While the second driving voltages VGMA1a, VGMA2a, VGMA3a, and VGMA4a are provided from the test-dedicated voltage generator T_VC, the driving controller 100 illustrated in FIG. 3 performs sensing compensation and optical compensation and generates a sensing compensation value for the sensing compensation and an optical compensation value for the optical compensation.

Figure 9B:
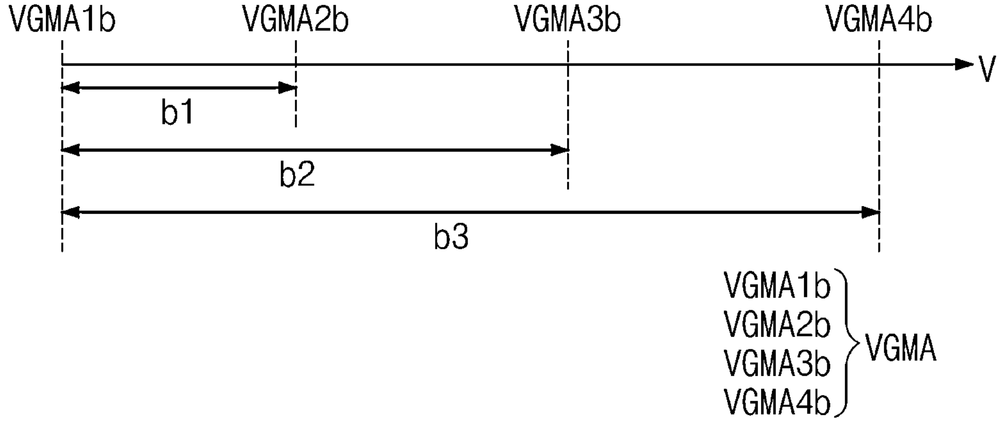
FIG. 9B is a diagram illustrating second driving voltages output from a voltage generator illustrated in FIG. 6.

FIG. 9B is a diagram illustrating the second driving voltages VGMA output from the voltage generator 300 illustrated in FIG. 6.

Referring to FIGS. 6 and 9B, the second driving voltages VGMA output from the test-dedicated voltage generator T_VC include second driving voltages VGMA1b, VGMA2b, VGMA3b, and VGMA4b. The second driving voltages VGMA1b, VGMA2b, VGMA3b, and VGMA4b have different voltage levels. In an embodiment, for example, the second driving voltages VGMA1b and VGMA2b have a voltage difference b1 therebetween, the second driving voltages VGMA1b and VGMA3b have a voltage difference b2 therebetween, and the second driving voltages VGMA1b and VGMA4b have a voltage difference b3 therebetween. Only four second driving voltages VGMA1b, VGMA2b, VGMA3b, and VGMA4b are illustrated in FIG. 9B, but the number of second driving voltages is not limited thereto.

The data driving circuit 200 illustrated in FIG. 3 converts the output image signal O_RGB into data signals based on the second driving voltages VGMA1b, VGMA2b, VGMA3b, and VGMA4b. The data signals may be provided to the plurality of data lines DL1 to DLm.

Figure 9C:
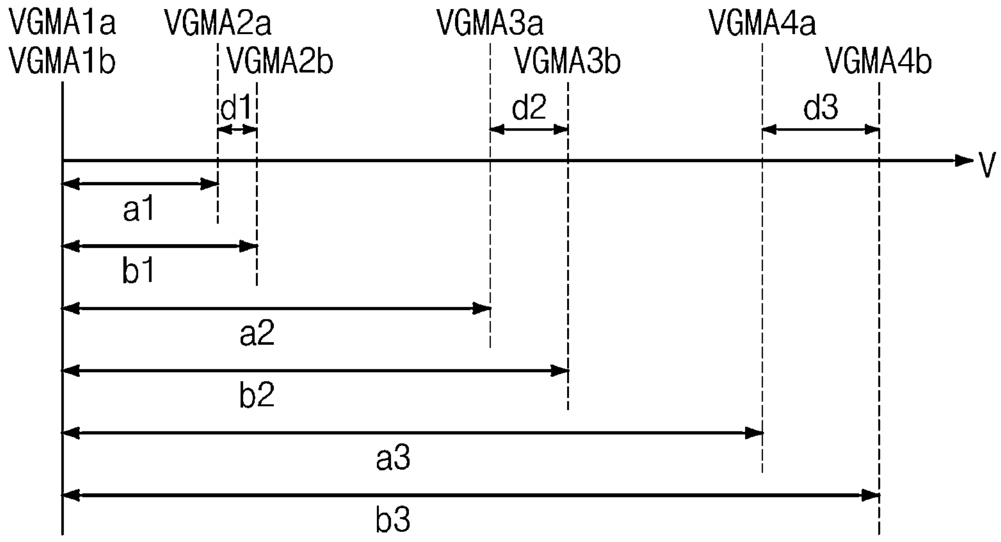
FIG. 9C is a diagram for comparing second driving voltages illustrated in FIG. 9A and second driving voltages illustrated in FIG. 9B.

FIG. 9C is a diagram for comparing the second driving voltages VGMAa illustrated in FIG. 9A and the second driving voltages VGMA illustrated in FIG. 9B.

Referring to FIGS. 5, 6, and 9C, each of the test-dedicated voltage generator T_VC and the voltage generator 300 may be implemented with an integrated circuit ("IC"). Due to a process error of the test-dedicated voltage generator T_VC and the voltage generator 300, voltage differences may be present between the second driving voltages VGMA1a, VGMA2a, VGMA3a, and VGMA4a generated by the test-dedicated voltage generator T_VC and the second driving voltages VGMA1b, VGMA2b, VGMA3b, and VGMA4b generated by the voltage generator 300.

In an embodiment, for example, the voltage difference between the second driving voltages VGMA2a and VGMA2b may be d1, the voltage difference between the second driving voltages VGMA3a and VGMA3b may be d2, and the voltage difference between the second driving voltages VGMA4a and VGMA4b may be d3.

The voltage differences d1, d2, and d3 cause the mismatch of the first gamma characteristic curve CV1 and the second gamma characteristic curve CV2 as illustrated in FIG. 8A. The above gamma characteristic offset of the display panel DP may reduce the quality of image of the display device DD.

Figure 10:
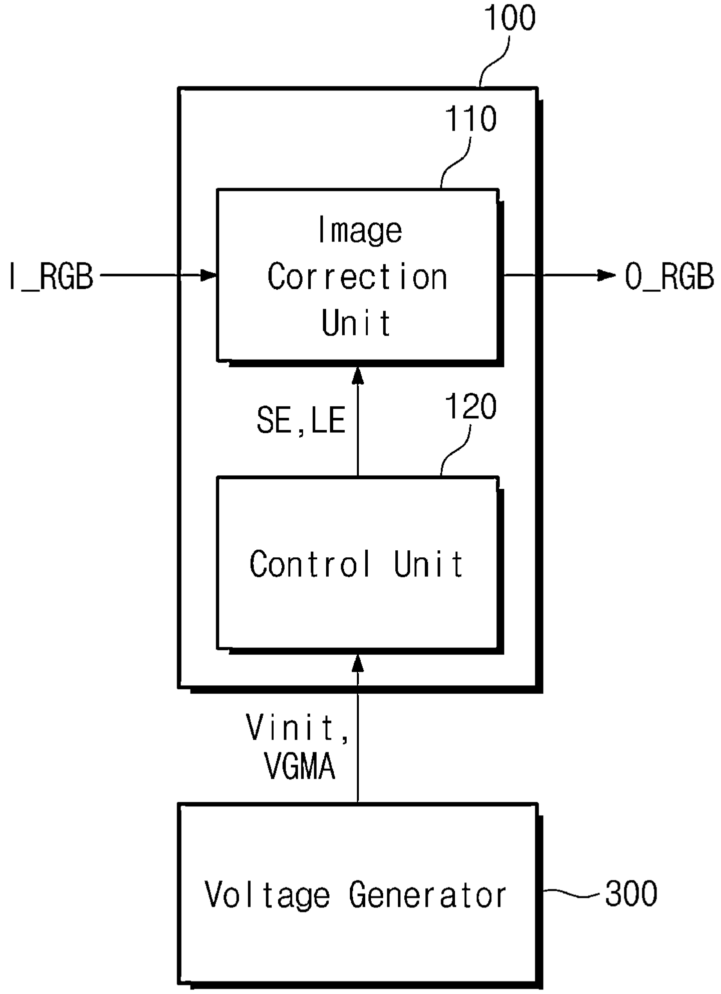
FIG. 10 is a block diagram of a driving controller according to an embodiment of the present disclosure.

FIG. 10 is a block diagram of a driving controller according to an embodiment of the present disclosure.

As illustrated in FIG. 10, the driving controller 100 includes an image correction unit 110 and a control unit 120.

The voltage generator 300 generate the first driving voltage Vinit and the second driving voltage VGMA.

The control unit 120 outputs a first error correction value SE for error correction of the sensing compensation and a second error correction value LE for error correction of the optical compensation, based on voltage level information of the first driving voltage Vinit and the second driving voltage VGMA from the voltage generator 300.

The image correction unit 110 receives the input image signal I_RGB and outputs the output image signal O_RGB compensated for to correspond to (or coincide with) the characteristic of the display panel DP. In an embodiment, the image correction unit 110 may output the output image signal O_RGB obtained by compensating for the input image signal I_RGB based on the first error correction value SE and the second error correction value LE.

Figure 11:
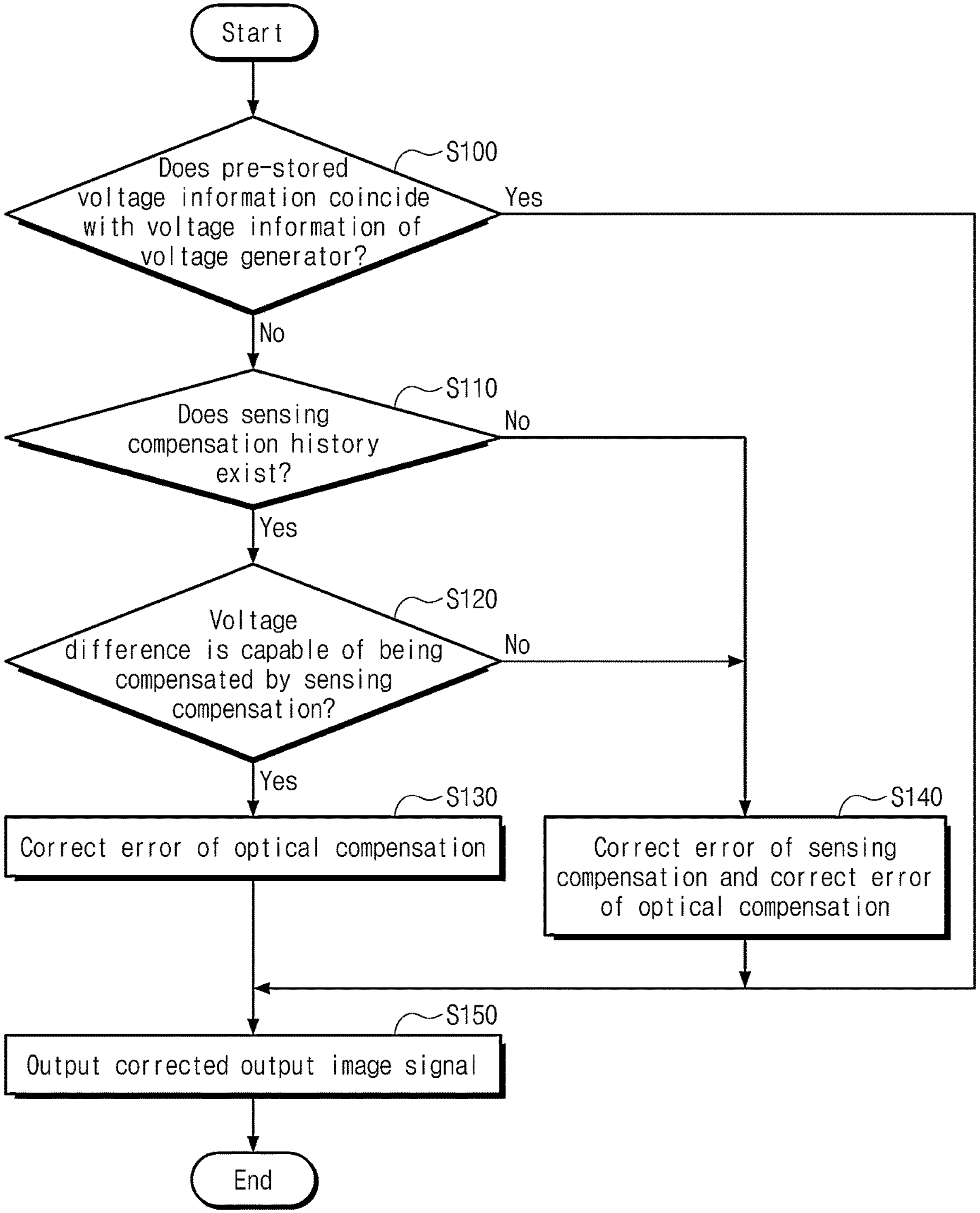
FIG. 11 is a flowchart for describing an operation of a display device according to an embodiment of the present disclosure.

FIG. 11 is a flowchart for describing an operation of a display device according to an embodiment of the present disclosure.

Referring to FIGS. 10 and 11, the control unit 120 receives information about the voltage levels of the first driving voltage Vinit and the second driving voltage VGMA from the voltage generator 300. In an embodiment, the information about the voltage levels of the first driving voltage Vinit and the second driving voltage VGMA may be in a form of a digital signal.

The control unit 120 compares the pre-stored information about the voltage levels of the first driving voltage Vinita and the second driving voltage VGMAa generated by the test-dedicated voltage generator T_VC (refer to FIG. 5) with the information about the voltage levels of the first driving voltage Vinit and the second driving voltage VGMA provided from the voltage generator 300 (S100).

When the pre-stored information about the voltage levels of the first driving voltage Vinita and the second driving voltage VGMAa generated by the test-dedicated voltage generator T_VC coincides with the information about the voltage levels of the first driving voltage Vinit and the second driving voltage VGMA provided from the voltage generator 300, the control unit 120 may provide the first error correction value SE and the second error correction value LE to the image correction unit 110. In an embodiment, each of the first error correction value SE and the second error correction value LE may be "0".

The image correction unit 110 may output the output image signal O_RGB obtained by compensating for the input image signal I_RGB based on the first error correction value SE and the second error correction value LE of the given value, which are provided from the control unit 120.

When the pre-stored information about the voltage levels of the first driving voltage Vinita and the second driving voltage VGMAa generated by the test-dedicated voltage generator T_VC do not coincide with the information about the voltage levels of the first driving voltage Vinit and the second driving voltage VGMA provided from the voltage generator 300, the control unit 120 may determine whether there is a sensing compensation history indicating that the sensing compensation operation is previously performed (S110).

When it is determined that the sensing compensation history exists, the control unit 120 determines whether a voltage difference is compensated for by the sensing compensation (S120). In an embodiment, for example, when a difference between the voltage of the data signal Di provided to the pixel PX through the data signal Di and the voltage fed back from the anode of the light emitting element ED to the third voltage line VL3 is smaller than a reference value in the sensing mode, the control unit 120 may determine that the voltage difference is compensated for by the sensing compensation.

When it is determined that the voltage difference is compensated for by the sensing compensation, the control unit 120 may provide the first error correction value SE with the given value to the image correction unit 110. In an embodiment, the first error correction value SE may be "0". When it is determined that the voltage difference is compensated for by the sensing compensation, error correction for the sensing compensation is unnecessary.

Also, when it is determined that the voltage difference is compensated for by the sensing compensation, the control unit 120 corrects an error of optical compensation (S130). In an embodiment, the control unit 120 may output the second error correction value LE for error correction of the optical compensation based on 1) a difference between the first driving voltage Vinita of the test-dedicated voltage generator T_VC (refer to FIG. 5), which is stored in advance before the first driving voltage Vinit is provided from the voltage generator 300, and the first driving voltage Vinit provided from the voltage generator 300 and 2) a difference between the second driving voltage VGMAa of the test-dedicated voltage generator T_VC (refer to FIG. 5), which is stored in advance before the second driving voltage VGMA is provided from the voltage generator 300, and the second driving voltage VGMA provided from the voltage generator 300 (S130).

The image correction unit 110 may output the output image signal O_RGB obtained by compensating for the input image signal I_RGB based on the first error correction value SE and the second error correction value LE provided from the control unit 120.

When it is determined in operation S110 that the sensing compensation history does not exist or when it is determined in operation S120 that the voltage difference is incapable of being compensated for by the sensing compensation, the control unit 120 outputs both the first error correction value SE for error correction of the sensing compensation and the second error correction value LE for error correction of the optical compensation (S140). In this case, the first error correction value SE and the second error correction value LE may be calculated based on 1) the difference between the first driving voltage Vinita of the test-dedicated voltage generator T_VC (refer to FIG. 5), which is stored in advance before the first driving voltage Vinit is provided from the voltage generator 300, and the first driving voltage Vinit provided from the voltage generator 300 and 2) the difference between the second driving voltage VGMAa of the test-dedicated voltage generator T_VC (refer to FIG. 5), which is stored in advance before the second driving voltage VGMA provided from the voltage generator 300, and the second driving voltage VGMA provided from the voltage generator 300 (S130).

Therefore, the quality of image displayed in the display panel DP may be effectively prevented from being reduced due to the differences between the first driving voltage Vinita and the second driving voltage VGMAa of the test-dedicated voltage generator T_VC and the first driving voltage Vinit and the second driving voltage VGMA provided from the voltage generator 300.

Figure 12:
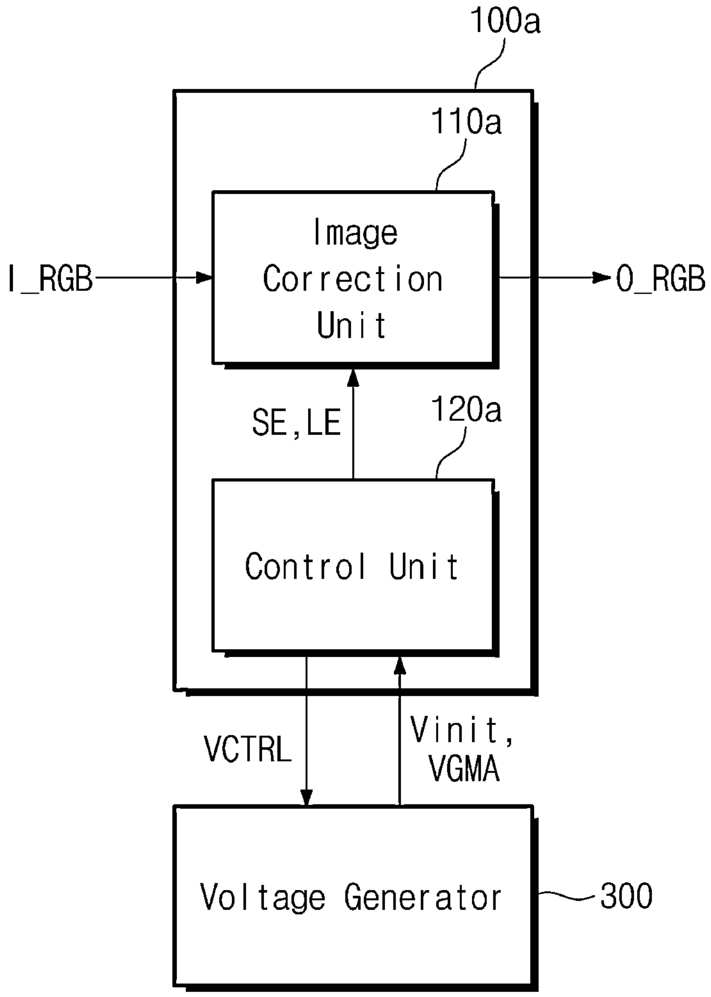
FIG. 12 is a block diagram of a driving controller according to another embodiment of the present disclosure.

FIG. 12 is a block diagram of a driving controller 100*a* according to another embodiment of the present disclosure.

Referring to FIG. 12, the driving controller 100*a* includes an image correction unit 110*a* and a control unit 120*a*.

The voltage generator 300 generate the first driving voltage Vinit and the second driving voltage VGMA.

The control unit 120*a* outputs the first error correction value SE for error correction of the sensing compensation and the second error correction value LE for error correction of the optical compensation.

The control unit 120*a* outputs a voltage control signal VCTRL based on information about the voltage levels of the first driving voltage Vinit and the second driving voltage VGMA from the voltage generator 300. The voltage control signal VCTRL may be a signal for changing the voltage levels of the first driving voltage Vinit and the second driving voltage VGMA.

The voltage generator 300 may change the voltage levels of the first driving voltage Vinit and the second driving voltage VGMA in response to the voltage control signal VCTRL.

Figure 13:
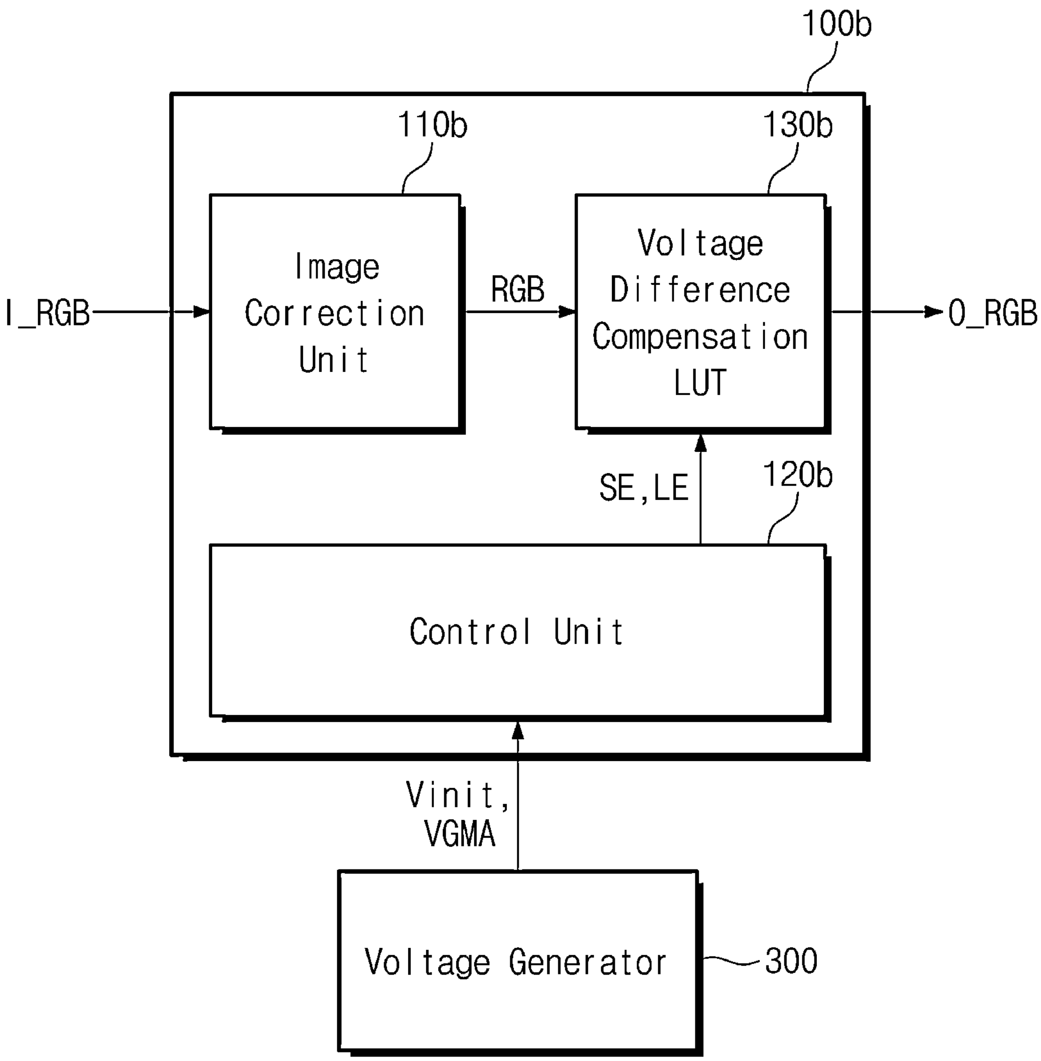
FIG. 13 is a block diagram of a driving controller according to still another embodiment of the present disclosure.

FIG. 13 is a block diagram of a driving controller 100*b* according to still another embodiment of the present disclosure.

Referring to FIG. 13, the driving controller 100*b* includes an image correction unit 110*b*, a control unit 120*b*, and a voltage difference compensation lookup table 130*b*.

The voltage generator 300 generate the first driving voltage Vinit and the second driving voltage VGMA.

The control unit 120*b* outputs the first error correction value SE and the second error correction value LE according to the differences between the first driving voltage Vinita and the second driving voltage VGMAa of the test-dedicated voltage generator T_VC (refer to FIG. 5) and the first driving voltage Vinit and the second driving voltage VGMA provided from the voltage generator 300.

The image correction unit 110*b* outputs an intermediate image signal RGB obtained by compensating for the input image signal I_RGB.

The voltage difference compensation lookup table 130*b* outputs the output image signal O_RGB obtained by compensating for the intermediate image signal RGB based on the first error correction value SE and the second error correction value LE.

Figure 14:
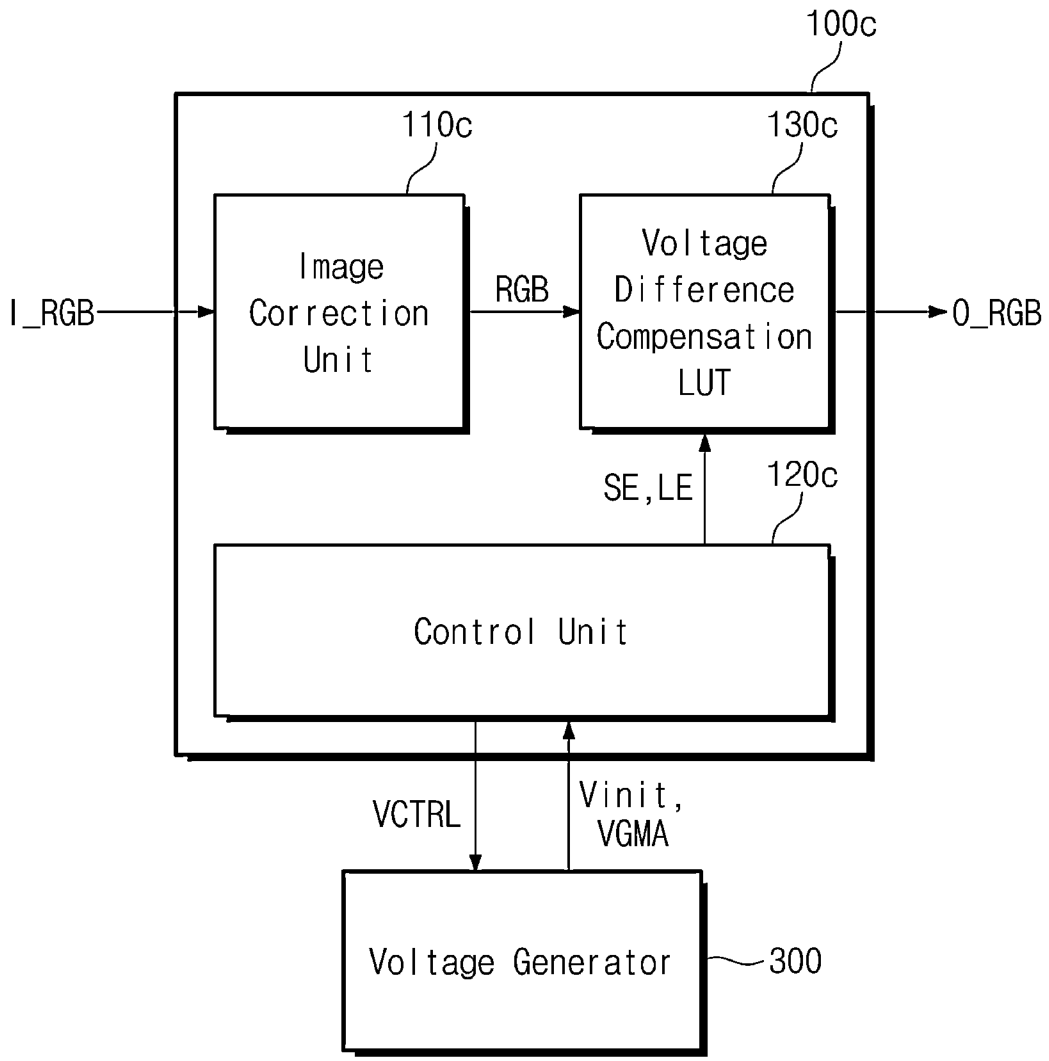
FIG. 14 is a block diagram of a driving controller according to yet another embodiment of the present disclosure.

FIG. 14 is a block diagram of a driving controller 100*c* according to yet another embodiment of the present disclosure.

Referring to FIG. 14, the driving controller 100*c* includes an image correction unit 110*c*, a control unit 120*c*, and a voltage difference compensation lookup table 130*c*.

The voltage generator 300 generate the first driving voltage Vinit and the second driving voltage VGMA.

The control unit 120*c* outputs the first error correction value SE and the second error correction value LE according to the differences between the first driving voltage Vinita and the second driving voltage VGMAa of the test-dedicated voltage generator T_VC (refer to FIG. 5) and the first driving voltage Vinit and the second driving voltage VGMA provided from the voltage generator 300.

The image correction unit 110*c* outputs an intermediate image signal RGB obtained by compensating for the input image signal I_RGB.

The voltage difference compensation lookup table 130*c* outputs the output image signal O_RGB obtained by compensating for the intermediate image signal RGB based on the first error correction value SE and the second error correction value LE. In an embodiment, the voltage difference compensation lookup table 130*c* may be implemented with a memory (e.g., a flash memory or an EEPROM).

The control unit 120*c* outputs the voltage control signal VCTRL based on information about the voltage levels of the first driving voltage Vinit and the second driving voltage VGMA from the voltage generator 300. The voltage control signal VCTRL may be a signal for changing the voltage levels of the first driving voltage Vinit and the second driving voltage VGMA.

The voltage generator 300 may change the voltage levels of the first driving voltage Vinit and the second driving voltage VGMA in response to the voltage control signal VCTRL.

In an embodiment, the control unit 120*c* may perform all the following operations based on the information about the voltage levels of the first driving voltage Vinit and the second driving voltage VGMA from the voltage generator 300: an operation of generating the first error correction value SE and the second error correction value LE and an operation of generating the voltage control signal VCTRL.

In an embodiment, for example, when a voltage difference between the first driving voltage Vinita of the test-dedicated voltage generator T_VC (refer to FIG. 5) and the first driving voltage Vinit provided from the voltage generator 300 is expressed by 8 bits, the control unit 120*c* may compensate for "u" upper bits (e.g., 5 upper bits) of the voltage difference by using the voltage control signal VCTRL and may compensate for "1" lower bits (e.g., 3 lower bits) of the voltage difference by using the first error correction value SE and the second error correction value LE.

Also, when a voltage difference between the second driving voltage VGMAa of the test-dedicated voltage generator T_VC (refer to FIG. 5) and the second driving voltage VGMA provided from the voltage generator 300 is expressed by 8 bits, the control unit 120*c* may compensate for "u" upper bits (e.g., 5 upper bits) of the voltage difference by using the voltage control signal VCTRL and may compensate for "1" lower bits (e.g., 3 lower bits) of the voltage difference by using the first error correction value SE and the second error correction value LE.

That is, the control unit 120*c* may combine the macro compensation for changing the voltage levels of the first driving voltage Vinit and the second driving voltage VGMA generated by the voltage generator 300 with the micro compensation using the voltage difference compensation lookup table 130*c*, thus improving the accuracy of voltage difference compensation.

A display device with the above configuration includes a voltage generator generating voltages for an operation of a display panel. A driving controller of the display device is configured to compensate for an image signal based on voltages generated by a test-dedicated voltage generator at a manufacturing step, so as to correspond to a characteristic of the display panel. Information of voltages generated from the voltage generator after the display device is completely manufactured may be different from information of voltages set in the driving controller of the display device. In this case, an error of sensing compensation and an error of optical compensation may be corrected to correspond to the voltages generated from the voltage generator provided in the display device.

Therefore, a display quality of the display device may be improved while minimizing a time for manufacturing.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a pixel;

a voltage generator configured to generate a driving voltage for an operation of the display panel; and a driving controller configured to receive an input image signal and to output an output image signal obtained by compensating for the input image signal based on a voltage difference between a voltage level of the driving voltage and a voltage level of a test driving voltage stored in advance, wherein the driving controller includes:

a control unit configured to output a first error correction value and a second error correction value; and an image correction unit configured to convert the input image signal into the output image signal based on the first error correction value and the second error correction value, wherein the control unit configured to:

determine whether voltage information of the driving voltage provided from the voltage generator coincides with voltage information stored in advance when the voltage information of the driving voltage is provided from the voltage generator;

when the voltage information stored in advance does not coincide with the voltage information of the driving voltage provided from the voltage generator, determine whether a sensing compensation history exists; and when the sensing compensation history does not exist, provide the first error correction value for error correction of sensing compensation and the second error correction value for error correction of optical compensation.

2. The display device of claim 1, wherein the test driving voltage stored in advance in the control unit is generated from a test-dedicated voltage generator used in a manufacturing process.

3. The display device of claim 2, wherein the sensing compensation is to compensate for a voltage difference between a voltage of a data signal provided to the pixel and a sensing voltage fed back from the pixel.

4. The display device of claim 2, further comprising:

a data driving circuit configured to convert the output image signal into a data signal based on the driving voltage and to provide the data signal to the pixel.

5. The display device of claim 4, wherein the optical compensation is to compensate for a color characteristic variance between grayscales of the data signal provided to the display panel.

6. The display device of claim 1, wherein the control unit further outputs a voltage control signal for changing the voltage level of the driving voltage.

7. The display device of claim 6, wherein the voltage generator changes the voltage level of the driving voltage in response to the voltage control signal.

8. A display device comprising:

a display panel including a pixel;

a voltage generator configured to generate a driving voltage for an operation of the display panel; and a driving controller configured to receive an input image signal and to output an output image signal obtained by compensating for the input image signal based on a voltage difference between a voltage level of the driving voltage and a voltage level of a test driving voltage stored in advance, wherein the driving controller includes:

a control unit configured to output a first error correction value and a second error correction value;

an image correction unit configured to output an intermediate image signal obtained by compensating for the input image signal based on a characteristic of the display panel; and a voltage difference compensation lookup table configured to convert the intermediate image signal into the output image signal based on the first error correction value and the second error correction value, wherein the control unit configured to:

determine whether voltage information of the driving voltage provided from the voltage generator coincides with voltage information stored in advance when the voltage information of the driving voltage is provided from the voltage generator;

when the voltage information stored in advance does not coincide with the voltage information of the driving voltage provided from the voltage generator, determine whether a sensing compensation history exists; and when the sensing compensation history does not exist, provide the first error correction value for error correction of sensing compensation and the second error correction value for error correction of optical compensation.

9. The display device of claim 8, wherein the test driving voltage stored in advance in the control unit is generated from a test-dedicated voltage generator used in a manufacturing process.

10. The display device of claim 9, wherein the sensing compensation is to compensate for a voltage difference between a voltage of a data signal provided to the pixel and a sensing voltage fed back from the pixel.

11. The display device of claim 9, further comprising:

a data driving circuit configured to convert the output image signal into a data signal based on the driving voltage and to provide the data signal to the pixel.

12. The display device of claim 11, wherein the optical compensation is to compensate for a color characteristic variance between grayscales of the data signal provided to the display panel.

13. The display device of claim 8, wherein the control unit further outputs a voltage control signal for changing the voltage level of the driving voltage.

14. The display device of claim 13, wherein the voltage generator changes the voltage level of the driving voltage in response to the voltage control signal.

15. An operating method of a display device, the method comprising:

determining whether voltage information of a driving voltage provided from a voltage generator coincides with voltage information stored in advance when the voltage information of the driving voltage is provided from the voltage generator;

when the voltage information stored in advance does not coincide with the voltage information of the driving voltage provided from the voltage generator, determining whether a sensing compensation history exists;

when the sensing compensation history does not exist, providing a first error correction value for error correction of sensing compensation and a second error correction value for error correction of optical compensation; and compensating for an input image signal based on the first error correction value and the second error correction value and proving an output image signal, which is obtained by compensating for the input image signal, to a display panel.

16. The method of claim 15, further comprising:

when it is determined that the sensing compensation history exists, determining whether a difference value of the voltage information stored in advance and the voltage information of the driving voltage provided from the voltage generator is capable of being compensated for by the sensing compensation; and when it is determined that the difference value of the voltage information stored in advance and the voltage information of the driving voltage provided from the voltage generator is capable of being compensated for by the sensing compensation, compensating for the input image signal based on the second error correction value and outputting the output image signal, which is obtained by compensating for the input image signal based on the second error correction value.

17. The method of claim 16, further comprising:

when it is determined that the difference value of the voltage information stored in advance and the voltage information of the driving voltage provided from the voltage generator is incapable of being compensated by the sensing compensation, compensating for the input image signal based on the first error correction value and the second error correction value and outputting the output image signal, which is obtained by compensating for the input image signal based on the first error correction value and the second error correction value.

18. The method of claim 15, wherein the sensing compensation is to compensate for a voltage difference between a voltage of a data signal provided to a pixel of the display panel and a sensing voltage fed back from the pixel, and wherein the optical compensation is to compensate for a color characteristic variance between grayscales of the data signal provided to the display panel.

* * * * *